US012732972B2

(12) United States Patent
Shibaike et al.

(10) Patent No.: US 12,732,972 B2
(45) Date of Patent: Sep. 8, 2026

(54) TERMINAL, RADIO COMMUNICATION METHOD, AND BASE STATION

(71) Applicant: NTT DOCOMO, INC., Tokyo (JP)

(72) Inventors: Naoya Shibaike, Tokyo (JP); Yuki Matsumura, Tokyo (JP); Haruhi Echigo, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 322 days.

(21) Appl. No.: 18/571,483

(22) PCT Filed: Jun. 25, 2021

(86) PCT No.: PCT/JP2021/024188
§ 371 (c)(1),
(2) Date: Dec. 18, 2023

(87) PCT Pub. No.: WO2022/269916
PCT Pub. Date: Dec. 29, 2022

(65) Prior Publication Data

US 2024/0292383 A1 Aug. 29, 2024

(51) Int. Cl.
*H04W 72/044* (2023.01)

(52) U.S. Cl.
CPC ................................ *H04W 72/044* (2013.01)

(58) Field of Classification Search
CPC ........................... H04W 72/044; H04B 7/0413
See application file for complete search history.

(56) References Cited

U.S. PATENT DOCUMENTS

2020/0244411 A1* 7/2020 Takeda .................. H04L 5/0055
2022/0345906 A1 10/2022 Kakishima et al.

FOREIGN PATENT DOCUMENTS

WO WO-2018163431 A1 * 9/2018 ............ H04W 72/23
WO 2021/064975 A1 4/2021

OTHER PUBLICATIONS

3GPP TS 36.300 V8.12.0; "Evolved Universal Terrestrial Radio Access (E-UTRA) and Evolved Universal Terrestrial Radio Access Network (E-UTRAN); Overall description; Stage 2 (Release 8)"; Apr. 2010 (149 pages).
International Search Report issued in corresponding International Application No. PCT/JP2021/024188, mailed on Jan. 18, 2022 (5 pages).
Written Opinion issued in corresponding International Application No. PCT/JP2021/024188, mailed on Jan. 18, 2022 (4 pages).

* cited by examiner

*Primary Examiner* — Hashim S Bhatti
(74) *Attorney, Agent, or Firm* — Osha Bergman Watanabe & Burton LLP

(57) ABSTRACT

A terminal according to one aspect of the present disclosure includes: a control section that determines, for each of a plurality of different transport blocks (TBs), the number of layers corresponding to the TB and controls association between each of the plurality of TBs and a layer; and a transmitting section that transmits, by using one or more layers, each of the plurality of different TBs in a same time resource and frequency resource. According to one aspect of the present disclosure, power control per layer/port can be appropriately performed.

5 Claims, 17 Drawing Sheets

FIG. 1A

| Bit field mapped to index | *codebookSubset= fullyAndPartialAndNonCoherent* |
|---|---|
| 0 | 1 layer: TPMI=0 |
| 1 | 1 layer: TPMI=1 |
| 2 | 2 layers: TPMI=0 |
| 3 | 1 layer: TPMI=2 |
| 4 | 1 layer: TPMI=3 |
| 5 | 1 layer: TPMI=4 |
| 6 | 1 layer: TPMI=5 |
| 7 | 2 layers: TPMI=1 |
| 8 | 2 layers: TPMI=2 |
| 9-15 | reserved |

FIG. 1B

| Bit field mapped to index | *codebookSubset= nonCoherent* |
|---|---|
| 0 | 1 layer: TPMI=0 |
| 1 | 1 layer: TPMI=1 |
| 2 | 2 layers: TPMI=0 |
| 3 | reserved |

| TPMI INDEX | PRECODING MATRIX W (ordered from left to right in increasing order of TPMI index) | | |
|---|---|---|---|
| 0-2 | $\frac{1}{\sqrt{2}}\begin{matrix}1 & 0\\ 0 & 1\end{matrix}$ | $\frac{1}{2}\begin{matrix}1 & 1\\ 1 & -1\end{matrix}$ | $\frac{1}{2}\begin{matrix}1 & 1\\ j & -j\end{matrix}$ |

FIG. 2

| port | (Pre-)configured power ratio |
| --- | --- |
| #0 | 0.4 |
| #1 | 0.3 |
| #2 | 0.2 |
| #3 | 0.1 |

FIG. 7

| DCI codepoint | Power ratio for Layer #0 | Power ratio for Layer #1 | Power ratio for Layer #2 | Power ratio for Layer #3 |
|---|---|---|---|---|
| 00 | 1 | 0 | 0 | 0 |
| 01 | 0.25 | 0.25 | 0.25 | 0.25 |
| 10 | 0.4 | 0.3 | 0.2 | 0.1 |
| 11 | 0.5 | 0.3 | 0.2 | 0 |

| DCI codepoint | Zero power layer |
|---|---|
| 00 | Layer #0 |
| 01 | Layer #1 |
| 10 | Layer #2 |
| 11 | Layer #3 |

FIG. 12B

| DCI codepoint | Zero power layer |
|---|---|
| 00 | Layer #0 |
| 01 | Layer #0 , Layer #1 |
| 10 | Layer #0 , Layer #1 , Layer #2 |
| 11 | Layer #0 , Layer #2 , Layer #3 |

FIG. 13A

| DCI codepoint | Power configuration value for Layer #0 | Power configuration value for Layer #1 | ... |
|---|---|---|---|
| 00 | X0 | Y0 | ... |
| 01 | X1 | Y1 | ... |
| 10 | X2 | Y2 | ... |
| 11 | X3 | Y3 | ... |

FIG. 13B

| DCI codepoint (for TB#1) | Power configuration value for Layer #0 | Power configuration value for Layer #1 | ... |
|---|---|---|---|
| 00 | X0 | Y0 | ... |
| 01 | X1 | Y1 | ... |
| 10 | X2 | Y2 | ... |
| 11 | X3 | Y3 | ... |

| DCI codepoint (for TB#2) | Power configuration value for Layer #0 | Power configuration value for Layer #1 | ... |
|---|---|---|---|
| 00 | X0 | Y0 | ... |
| 01 | X1 | Y1 | ... |
| 10 | X2 | Y2 | ... |
| 11 | X3 | Y3 | ... |

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In Rel-15/16 NR, control is performed on transmission/reception of a channel/signal using a plurality of antenna ports to have equal power between the antenna ports and to have equal power between layers.

However, in further future radio communication systems (such as 6G), faster communication in Multi Input Multi Output (MIMO) environment is desired to be achieved. However, studies have not yet advanced how to achieve high speed communication. Unless this is made clear, communication quality may deteriorate.

Thus, an object of the present disclosure is to provide a terminal, a radio communication method, and a base station that can appropriately perform power control per layer/port.

Solution to Problem

A terminal according to one aspect of the present disclosure includes: a control section that determines, for each of a plurality of different transport blocks (TBs), the number of layers corresponding to the TB and controls association between each of the plurality of TBs and a layer; and a transmitting section that transmits, by using one or more layers, each of the plurality of different TBs in a same time resource and frequency resource.

Advantageous Effects of Invention

According to one aspect of the present disclosure, power control per layer/port can be appropriately performed.

BRIEF DESCRIPTION OF DRAWINGS

FIG. 1A and FIG. 1B are diagrams to show examples of TPMI notification to a UE configured with transform precoding being disabled and maximum rank=2 and configured to perform transmission for two antenna ports.

FIG. 2 is a diagram to show an example of correspondences between a TPMI index and a precoding matrix W.

FIG. 7 is a diagram to show an example of configured power distribution ratios.

FIG. 11 is a diagram to show an example of information related to power distribution according to Embodiment 5-2.

FIG. 12A and FIG. 12B are diagrams to show examples of a method of changing a power ratio(s) according to Embodiment 5-3.

FIGS. 13A and 13B are diagrams to show examples of correspondences between a DCI codepoint and power ratios according to Embodiment 5-5.

DESCRIPTION OF EMBODIMENTS (PUSCH Precoder)

Figure 3:
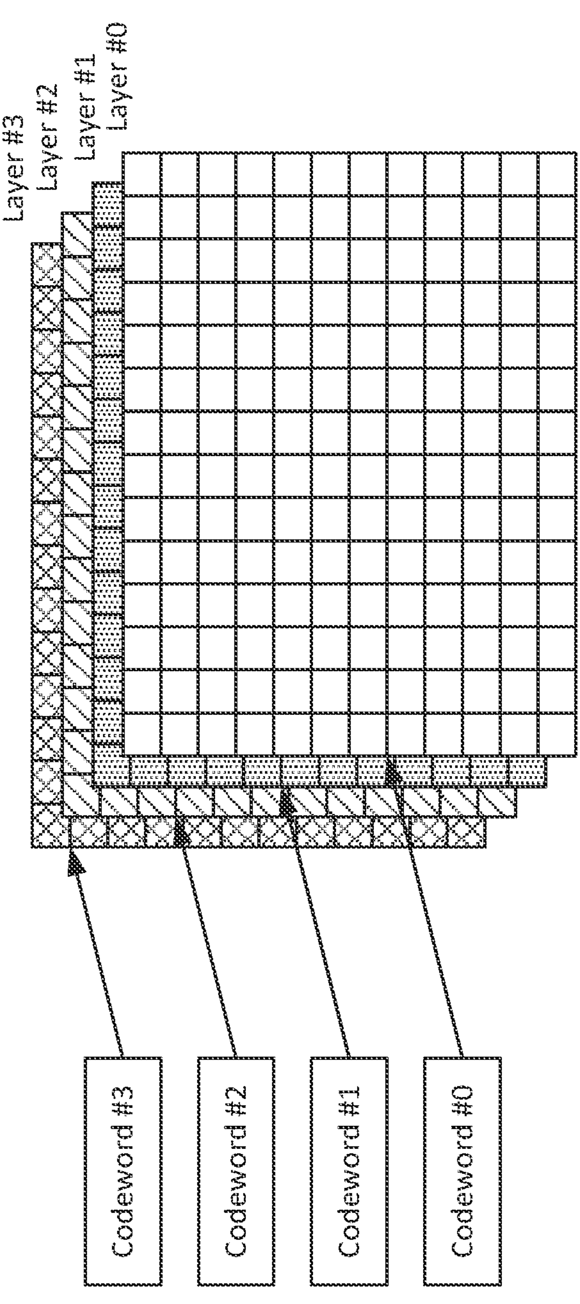
FIG. 3 is a diagram to show an example of mapping between CWs and layers according to a first embodiment.

In NR, a user terminal (User Equipment (UE)) may support at least one of codebook (CB) based transmission and non-codebook (NCB) based transmission.

For example, the UE may use at least a sounding reference signal (SRS) resource index (SRI) to determine a precoder (precoding matrix) for transmission of an uplink shared channel (Physical Uplink Shared Channel (PUSCH)) of at least one of CB based and NCB based.

The UE may receive information to be used for transmission of a reference signal for measurement (for example, a sounding reference signal (SRS)) (SRS configuration information, for example, a parameter in an RRC control element "SRS-Config").

Specifically, the UE may receive at least one of information related to one or a plurality of SRS resource sets (SRS resource set information, for example, an RRC control element "SRS-ResourceSet") and information related to one or a plurality of SRS resources (SRS resource information, for example, an RRC control element "SRS-Resource").

One SRS resource set may relate to a certain number of SRS resources (may group the certain number of SRS resources). Each SRS resource may be identified by an SRS resource indicator (SRI) or an SRS resource ID (Identifier).

The SRS resource set information may include an SRS resource set ID (SRS-ResourceSetId), a list of SRS resource IDs (SRS-ResourceId) used in the resource set, an SRS resource type, and information of SRS usage.

The usage (RRC parameter "usage," L1 (Layer-1) parameter "SRS-SetUse") may be, for example, beam management (beamManagement), codebook (CB), non-codebook (noncodebook (NCB)), antenna switching, or the like. An SRS with codebook or non-codebook usage may be used to determine a precoder for codebook based or non-codebook based uplink shared channel (Physical Uplink Shared Channel (PUSCH)) transmission based on an SRI.

In a case of CB based transmission, the UE may determine a precoder for the PUSCH transmission, based on an SRI, a transmitted rank indicator (TRI), a transmitted precoding matrix indicator (TPMI), and the like. In a case of NCB based transmission, the UE may determine a precoder for the PUSCH transmission, based on the SRI.

The UE may be notified of the SRI, the TRI, the TPMI, and the like by using downlink control information (DCI). The SRI may be specified by an SRS Resource Indicator field (SRI field) of the DCI or may be specified by a parameter "srs-ResourceIndicator" included in an RRC information element "ConfiguredGrantConfig" for a configured grant PUSCH.

The TRI and the TPMI may be specified by precoding information and number of layers field ("Precoding information and number of layers" field) of the DCI. Note that, for simplicity, the "precoding information and number of layers field" is also referred to simply as a "precoding field" below.

Note that the maximum number of layers (maximum rank) of UL transmission may be configured for the UE by an RRC parameter "maxRank."

The UE may report UE capability information related to a precoder type and be configured, by a base station, with the precoder type based on the UE capability information by higher layer signaling. The UE capability information may be precoder type information to be used by the UE in PUSCH transmission (which may be indicated by an RRC parameter "pusch-TransCoherence").

In the present disclosure, the higher layer signaling may be, for example, any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. For example, the broadcast information may be master information blocks (MIBs), system information blocks (SIBs), and the like.

The UE may determine a precoder to be used for the PUSCH transmission, based on precoder type information (which may be indicated by an RRC parameter "codebookSubset") included in PUSCH configuration information notified by higher layer signaling ("PUSCH-Config" information element of RRC signaling). The UE may be configured with a subset of the codebook specified by the TPMI, by codebookSubset.

Note that the precoder type may be specified by any of or a combination of at least two of full coherent (fully coherent, coherent), partial coherent, and non-coherent (non coherent) (which may be indicated, for example, by a parameter such as "fullyAndPartialAndNonCoherent" or "partialAndNonCoherent."

Full coherent may mean that all the antenna ports to be used for transmission are synchronized (which may be expressed as being able to be matched in terms of phase, having the same precoder to be applied, and the like). Partial coherent may mean that some ports of the antenna ports to be used for transmission are synchronized but the ports and the other ports are not synchronized. Non-coherent may mean that the antenna ports to be used for transmission are not synchronized.

Note that a UE that supports the precoder type, full coherent, may be assumed to support the precoder types, partial coherent and non-coherent. A UE that supports the precoder type, partial coherent, may be assumed to support the precoder type, non-coherent.

The precoder type may be interpreted as coherency, PUSCH transmission coherence, a coherent type, a coherence type, a codebook type, a codebook subset, a codebook subset type, and the like.

The UE may determine a precoding matrix corresponding to the TPMI index obtained from DCI for scheduling UL transmission (for example, DCI format 0_1, this similarly applies below), from a plurality of precoders (which may be referred to as a precoding matrix, a codebook, and the like) for CB based transmission.

Specifically, in Rel-15/16 NR, when non-codebook based transmission is used for a PUSCH, the UE may be configured with an SRS resource set including four SRS resources at maximum with non-codebook usage, by RRC, and may be indicated with one or more of the four SRS resources at maximum by DCI (two-bit SRI field).

The UE may determine the number of layers (transmission rank) for the PUSCH, based on the SRI field. For example, the UE may determine that the number of SRS resources indicated by the SRI field is the same as the number of layers for the PUSCH. The UE may calculate a precoder for the SRS resource.

When a CSI-RS related to the SRS resource (or SRS resource set to which the SRS resource belongs) (which may be referred to as an associated CSI-RS) is configured in a higher layer, a transmit beam for the PUSCH may be calculated based on (measurement of) the configured related CSI-RS. Otherwise, a transmit beam for the PUSCH may be specified by an SRI.

Note that the UE may be configured with whether to use codebook based PUSCH transmission or use non-codebook based PUSCH transmission by a higher layer parameter "txConfig" indicating a transmission scheme. The parameter may indicate a value of "codebook" or "non-codebook (nonCodebook)."

In the present disclosure, a codebook based PUSCH (codebook based PUSCH transmission, codebook based transmission) may mean a PUSCH when the UE is configured with "codebook" as a transmission scheme. In the present disclosure, a non-codebook based PUSCH (non-codebook based PUSCH transmission, non-codebook based transmission) may mean a PUSCH when the UE is configured with "non-codebook" as a transmission scheme.

FIG. 1A and FIG. 1B are diagrams to show examples of TPMI notification to a UE configured with transform precoding being disabled and maximum rank=2 and configured to perform transmission for two antenna ports.

Note that the transform precoding being enabled may mean using Discrete Fourier Transform spread OFDM (DFT-s-OFDM), and the transform precoding being disabled may mean using CP-OFDM.

In the present example, shown is relationships (table) between a precoding field (indicated as "bit field mapped to index" in the drawings, this applies also to subsequent similar drawings) of DCI and a TPMI (TPMI index) in Rel-15 NR. Note that a table in FIG. 1A with a description of "codebookSubset=fullyAndPartialAndNonCoherent" indicates that this is a table referred by a full coherent UE, and a table in FIG. 1B with a description of "codebookSubset=nonCoherent" indicates that this is a table referred by a non-coherent UE.

The UE determines the number of layers to be applied to transmission and a TPMI for a precoding matrix, based on the value in the precoding field included in the DCI and the table in FIG. 1A/FIG. 1B. For example, the full coherent UE specified with a precoding field=2 determines that the number of layers=2 and TPMI=0 are used for PUSCH transmission, based on FIG. 1A. Note that "reserved" corresponds to a value planned to be defined in the future.

FIG. 2 is a diagram to show an example of correspondences between a TPMI index and a precoding matrix W. FIG. 2 shows the precoding matrix W for two-layer transmission using two antenna ports with transform precoding being disabled.

The UE determined to use the number of layers=2 and TPMI=0 for the PUSCH transmission according to FIG. 1A applies W corresponding to TPMI=0 in FIG. 2 to the PUSCH transmission.

Note that the UE may calculate a block Z of vectors of complex number symbols for respective antenna ports to be mapped to a resource (for example, a resource element), based on W and a block Y of vectors of complex number symbols for respective layers after transform precoding (or after layer mapping). For example, this may be obtained according to Z=WY.

In existing specifications of Rel-15/16 NR, it is defined that W is specified by the TPMI indicated by the precoding field as described above for codebook based transmission, while W is an identity matrix for non-codebook based transmission.

For W in FIG. 2, the power of layer 1 (first column vector) and the power of layer 2 (second column vector) are the same. For example, for TPMI=0, the sum of squares of the components of a column vector of layer 1 and the sum of squares of the components of a column vector of layer 2 are each 1/2 (=(1/√2)^2), and hence the power ratio between layer 1 and layer 2 is 1:1.

As described above, in existing Rel-15/16 NR, control is performed on transmission of a channel/signal using a plurality of antenna ports to have equal power between the antenna ports and to have equal power/the same modulation and coding scheme (MCS) between layers.

Note that similar control is applied not only to uplink transmission (for example, a PUSCH) but also downlink transmission (for example, a Physical Downlink Shared Channel (PDSCH)).

Thus, in the existing Rel-15/16 NR, configuration of power is determined for each beam indicated by an SRI. When a certain beam is transmitted by using a plurality of ports (streams), power is equally distributed among the plurality of respective ports. Even at the time when precoding (for example, layer-port mapping) is applied, no difference in power (amplitude) occurs among the ports.

Meanwhile, in further future radio communication systems (such as 6G), faster communication in Multi Input Multi Output (MIMO) environment is desired to be achieved.

More concretely, expansion of space multiplexing capacity by expanding the number of MIMO ranks is studied for improvement of uplink (UL) communication capacity. With this expansion, it is possible to multiplex a larger number of multi-transmissions in the space direction to perform simultaneous transmission.

In future radio communication systems, it is conceivable to use precoding based on singular value decomposition (SVD), eigenmode transmission (E-SDM (Eugenbeam Space Division Multiplexing)), water filling principle, or the like to distribute power to ports in descending order of channel singular value, to thereby maximize channel capacity.

Singular value decomposition of a channel matrix H may mean decomposing the channel matrix H as $H=V_L \Sigma U_L^H$ where $V_L$ and $U_L$ are orthogonal matrices. Here, $\Sigma$ may denote a diagonal matrix. $U_L^H$ may denote a matrix (adjoint matrix) obtained by subjecting $U_L$ to Hermitian transpose.

Eigenmode transmission may be a method of using $U_L$ and $V_L^H$ respectively as transmission weight and reception weight to regard channels as a plurality of (rank) independent communication channels.

Water pouring principle may indicate a method of power distribution to individual streams for achieving maximization of channel capacity at the time of E-SDM. Optimal power distribution for each stream i may be expressed by the following equation.

[Math. 1]

$$P_i = \max\left(\frac{1}{a} - \frac{2\sigma^2}{\lambda_i}, 0\right) \quad \text{(Equation 1)}$$

where a denotes a constant satisfying $$\Sigma_{i=1}^{N} P_i = P_{Total},$$

and $\sigma$ denotes a noise value (for example, $\sigma^2$ denotes an average noise power)

Note that, in (Equation 1), parameters may be different in coefficient.

However, study has not been advanced yet how to distribute power to individual MIMO layers when the number of MIMO ranks is expanded. More concretely, the power distribution ratios among ports (streams) affects channel capacity (communication channel capacity) achievable by transmission beams of the ports, but study has not been advanced about optimization of power distribution ratios in Rel-15/16 NR. Unless this is made clear, an increase in communication throughput may be prevented.

Thus, the inventors of the present invention came up with the idea of a method for appropriately performing power distribution among layers/ports. More concretely, the inventors of the present invention came up with the idea of a method of allowing power distribution among layers/ports to be variable in transmission of channels/signals using space multiplexing in MIMO.

Embodiments according to the present disclosure will be described in detail with reference to the drawings as follows. The radio communication methods according to respective embodiments may each be employed individually, or may be employed in combination.

Note that in the present disclosure, "A/B" may mean "at least one of A and B." In the present disclosure, "A/B/C" may mean "at least one of A, B, and C."

In the present disclosure, the higher layer signaling may be, for example, any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

In the present disclosure, activate, deactivate, indicate, select, configure, update, determine, and the like may be interchangeably interpreted.

In the present disclosure, a panel, a beam, a panel group, a beam group, an Uplink (UL) transmission entity, a TRP, spatial relation information (SRI), a spatial relation, a control resource set (CORESET), a Physical Downlink Shared Channel (PDSCH), a codeword (CW), a transport block (TB), a base station, a certain antenna port (for example, a demodulation reference signal (DMRS) port), a certain antenna port group (for example, a DMRS port group), a certain group (for example, a code division multiplexing (CDM) group, a certain reference signal group, or a CORESET group), a certain resource (for example, a certain reference signal resource), a certain resource set (for example, a certain reference signal resource set), a CORESET pool, a PUCCH group (PUCCH resource group), a spatial relation group, a downlink Transmission Configuration Indication state (TCI state) (DL TCI state), an uplink TCI state (UL TCI state), a unified TCI state, QCL, and the like may be interchangeably interpreted.

A spatial relation information Identifier (ID) (TCI state ID) and spatial relation information (TCI state) may be interchangeably interpreted. "Spatial relation information" may be interpreted as a "set of pieces of spatial relation information," "one or a plurality of pieces of spatial relation information," and the like. A TCI state and TCI may be interchangeably interpreted.

In the present disclosure, an index, an ID, an indicator, and a resource ID may be interchangeably interpreted. In the present disclosure, a sequence, a list, a set, a group, a cluster, a subset, and the like may be interchangeably interpreted.

In the following description of embodiments, "spatial relation information (SRI)," "spatial relation information for PUSCH," a "spatial relation," a "UL beam," a "UE transmit beam," "UL TCI," a "UL TCI state," a "spatial relation of a UL TCI state," an SRS resource indicator (SRI), an SRS resource, a precoder, and the like may be interchangeably interpreted.

In the present disclosure, a layer, a port (antenna port), an SRS port, a DMRS port, a stream, and the like may be interchangeably interpreted. For example, power ratios among layers may be interpreted as power ratios among ports.

A layer may be interpreted as a group of one or more layers (layer group), a group of one of more of the ports (port group), and the like, and vice versa. For example, layers 1, 2, and 3 may be handled so that layers 1 and 2 belong to layer group 1 and layer 3 belongs to layer group 2.

Note that "layer i" (i is an integer) in the present disclosure may be interpreted as layer i−1, may be interpreted as layer i+1, or may be interpreted as any other layer number (in other words, may be interpreted as any layer number).

In the present disclosure, a channel and a signal may be interchangeably interpreted. In the present disclosure, channels/signals being space multiplexed may mean channels/signals being transmitted in the same time resource and frequency resource, channels/signals being transmitted by using different layers in the same time resource and frequency resource, and the like.

A "PUSCH" in the embodiments below may be interpreted as another UL channel/UL signal (for example, a PUCCH, a DMRS, or an SRS).

A "PDSCH" in the embodiments below may be interpreted as another DL channel/DL signal (for example, a PDCCH, a DMRS, or a CSI-RS).

"Power" in the embodiments below may be interpreted as transmission power and vice versa and may mean PUSCH transmission power, PDSCH transmission power, and the like. In the present disclosure, power may be interpreted as at least one of an absolute value of precoding vector/matrix, the sum of squares of all the elements of a specific column (or row) of the vector/matrix, the sum of squares of all the elements of the vector/matrix, and the like.

(Radio Communication Method)

First Embodiment

Correspondences (mapping) between a TB and a layer may be defined/configured. The mapping between a TB and a layer may be referred to as a TB-layer mapping. In each embodiment of the present disclosure, a TB and a CW may be interchangeably interpreted. A layer, a port, a layer group, a port group, and the like may be interchangeably interpreted.

The mapping may be categorized into a plurality of types of mapping (or mapping types). In the following description, mapping 1 and mapping 2 are described as examples. However, these are not restrictive.

A specific layer (s) (for example, layers of 1 to N (N is an integer of 1 or larger)) may be mapped to a first TB, and a layer (s) (for example, layers/ports of N+1 and larger) other than the specific layer (s) may be mapped to a second TB (mapping 1). In other words, the specific layer (s) (for example, the layer (s) of 1 to N may correspond to the first TB, and the layer (s) (for example, the layers/ports of N+1 and larger) other than the specific layer (s) may correspond to the second TB.

An N layer (s) at maximum may be mapped to one TB (mapping 2). In other words, one TB may correspond to an N layer (s) at maximum.

The number of layers that can be mapped to each of different TBs may be independently determined based on a specific condition.

The specific condition may be a condition based on (the maximum value of) the number of layers that can be multiplexed per transmission occasion.

The specific condition may be a condition based on the size (payload/the number of bits) of each TB/CW. For example, assume that four layers can be multiplexed at maximum, and two CWs (for example, CW #A and CW #B) are multiplexed. In this case, if $|\text{size (CW \#A)}-\text{size (CW \#B)}|\geq X$ (X is a specific value) and size (CW #A)−size (CW

#B)>0 are satisfied, three layers may be mapped to CW #A, and one layer may be mapped to CW #B.

Note that examples described below are conceivable as examples of TB-layer mapping:

one TB and the N layer (s) correspond, N layers in total (only one TB is transmitted), one TB and the N layers correspond, M*N layers in total (M TBs are (multiplexed and) transmitted, and each TB uses spatial diversity in N layers), and one TB and one layer correspond, M layers in total (M TBs are (multiplexed and) transmitted, and each TB does not use spatial diversity).

FIG. 3 is a diagram to show an example of mapping between CWs and layers according to a first embodiment. In the example shown in FIG. 3, four CWs are transmitted by using four layers, and one CW corresponds to one layer.

Figure 4:
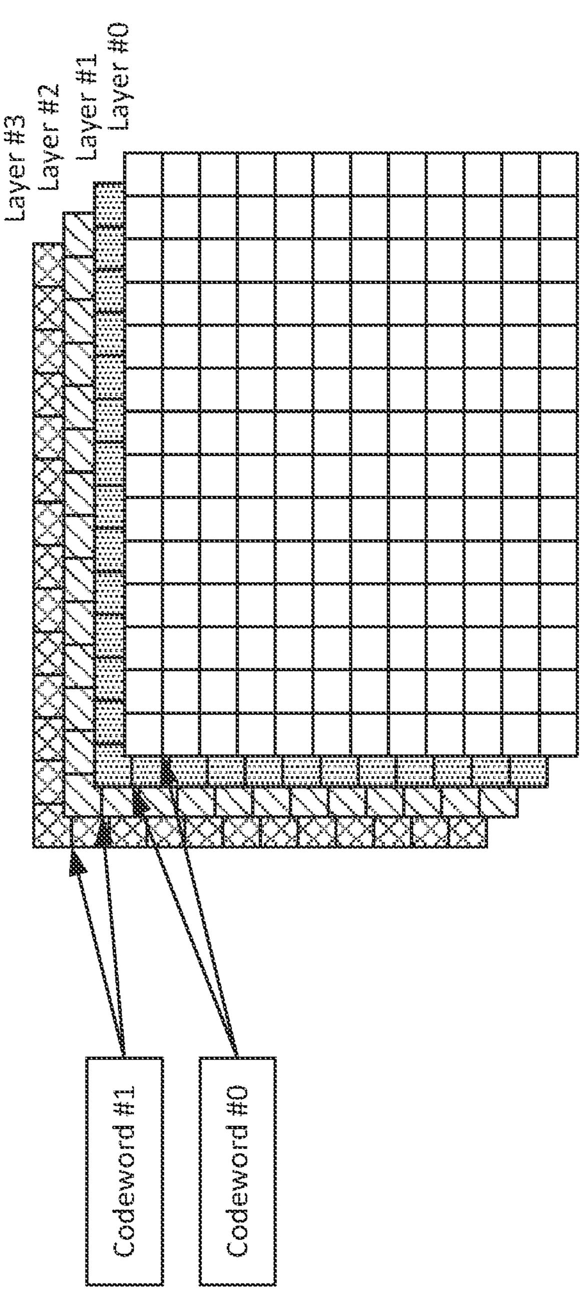
FIG. 4 is a diagram to show another example of the mapping between CWs and layers according to the first embodiment.

FIG. 4 is a diagram to show another example of the mapping between CWs and layers according to the first embodiment. In the example shown in FIG. 4, two CWs are transmitted by using four layers, and one CW corresponds to two layers.

Figure 5:
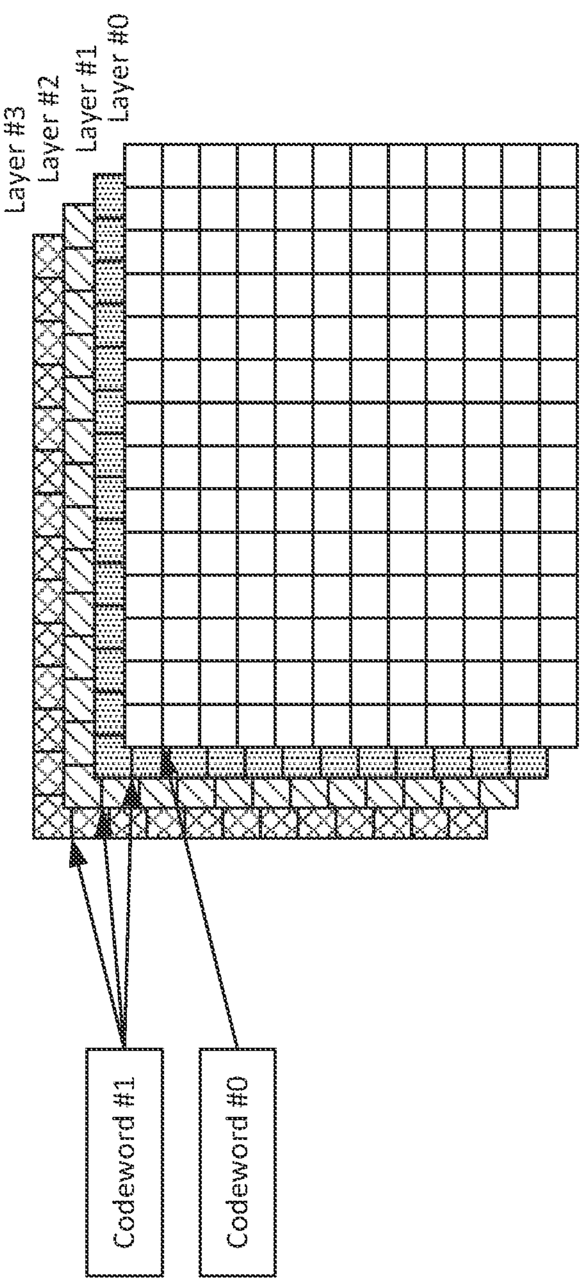
FIG. 5 is a diagram to show another example of the mapping between CWs and layers according to the first embodiment.

FIG. 5 is a diagram to show another example of the mapping between CWs and layers according to the first embodiment. In the example shown in FIG. 5, two CWs are transmitted by using four layers, and codeword #0 corresponds to one layer (layer #0) while codeword #1 corresponds to three layers (layers #1 to #3).

The UE may determine TB-layer mapping, based on a specific condition.

The specific condition may be at least one of the following:

TB size, received power (for example, an RSRP)/reception quality (for example, an RSRQ/SINR) of a DL/UL RS transmitted in each layer, and parameter indicating importance (priority) of each TB.

For example, the UE may determine that a relatively larger number of layers correspond to a TB being relatively large in size among a plurality of TBs. For example, the UE may determine that a relatively larger number of layers correspond to a TB being relatively high in priority among the plurality of TBS.

The UE may report information related to the judged/determined TB-layer mapping to a network (NW, for example, the base station). The feedback may be performed periodically or in response to notification/triggering from the NW.

In this way, for example, TB-layer mapping in a state where the relationships between a power ratio and a layer (s) are semi-statically fixed/configured, for example, the order of power ratios of the layers is matched with the order of layer numbers is variable. Hence, it is possible to perform flexible control of power ratios according to TB characteristics while suppressing a notification overhead increase.

The UE may be configured/indicated with/notified of TB-layer mapping by the NW. The configuration/indication/notification may be performed by at least one of higher layer signaling and physical layer signaling.

For example, the UE may be notified of/indicated with the number of layers per TB by using DCI.

For example, when a plurality of TBs (for example, PUSCHs) transmitted by using different layers are scheduled/activated by one piece of DCI, information related to the number of layers per TB may be included in the one piece of DCI.

For example, when a plurality of TBs (for example, PUSCHs) transmitted by using different layers are scheduled/activated by respective different pieces of DCI, information related to the number of layers per TB may be included in the corresponding piece of DCI or may be included in a specific piece of DCI. The specific piece of DCI may be at least one of DCI that the UE has received last (most recently), DCI transmitted last (most recently) in the time direction, and DCI having the last (most recent) monitoring occasion.

For example, the UE may be configured with a plurality of pieces of information (candidates) related to the TB-layer mapping by using RRC signaling/a MAC CE and indicated with mapping by the plurality of pieces of information by using DCI.

According to the first embodiment above, spatial diversity effects and space multiplexing effects by MIMO can be appropriately used according to TBs/CWs to be multiplexed.

Second Embodiment

A second embodiment relates to power control based on the sizes of transport blocks (Transport Block Sizes (TBSs)).

In the second embodiment, based on the TBSs of transmission channels/signals to be multiplexed, power distribution for the transmission channels/signals may be variable. The UE may determine the power distribution for the transmission channels/signals, based on the TBSs of the transmission channels/signals to be multiplexed.

Embodiment 2-1

In Embodiment 2-1, based on the ratios of the TBSs among a plurality of transmission channels/signals (for example, PUSCHs) of different TBs, the power distribution for the plurality of transmission channels/signals may be controlled.

For example, when X (for example, X=4) PUSCHs of different TBSs are space multiplexed, the UE may determine power distribution ratios for the PUSCHs, based on the ratios of the TBSs among the four PUSCHs.

In Embodiment 2-1, power distribution may be determined according to steps 1 to 3 described below. In the following, description will be given by taking four PUSCHs (PUSCHs #0 to #3) as an example. However, the number of PUSCHs is not limited to this, and channels/signals to be transmitted may be any channels/signals.

Determine/calculate the TBSs (TBSs #0 to #3) of the four PUSCHs (PUSCHs #0 to #3) to be space multiplexed (step 1).

Figure 6:
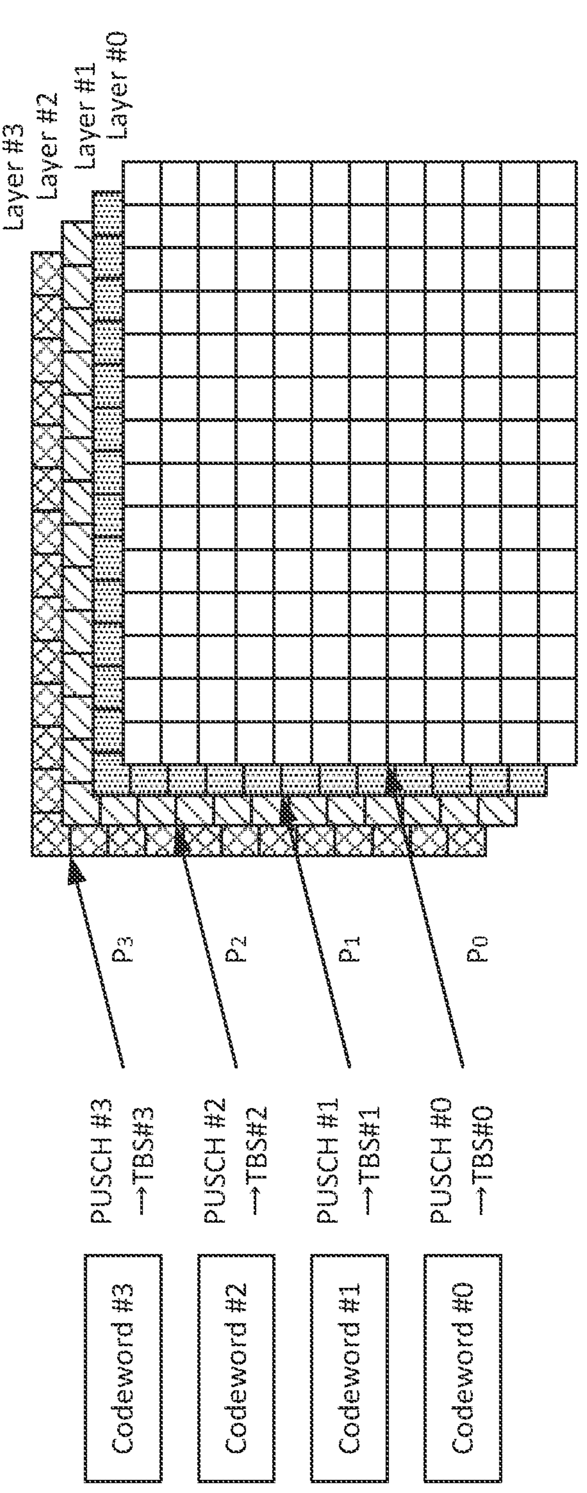
FIG. 6 is a diagram to show an example of mapping according to Embodiment 2-1.

Map the PUSCHs to respective layers (step 2). FIG. 6 shows a case where PUSCHs #0 to #3 are mapped to layers #0 to #3.

At the time of association (mapping) between layers and ports, determine a power $P_i$ of each port, based on the ratios of the TBSs (step 3). FIG. 6 shows a case where transmission powers of PUSCHs #0 to #3 are denoted by $P_0$ to $P_3$.

The power $P_i$ corresponding to a port i (here, i=0 to 3) in step 3 above may be calculated according to the following equation.

[Math. 2]

$$P_i = \left(TBS_i / \sum_{v=1}^{Y} TBS_v\right) P_{Total} \quad \text{(Equation 2)}$$

where Y denotes a total number of layers/ports, and $P_{Total}$ denotes a total available power.

Here, $P_{Total}$ may be transmission power determined by open loop power control/closed loop power control.

At the time of association (mapping) between layers and ports, a power based on the ratios of the TBSs may be configured for the power $P_i$ of each port by using higher layer signaling (step 3').

When mapping 1 above is applied (mapping 1 is assumed), the UE may control power distribution according to steps 1 to 3 (3') above.

When mapping 2 above is applied (mapping 2 is assumed), the UE may determine that layers/ports corresponding to the same TB/CW belong to one layer group/port group.

In this case, for determination of the power ratios among layer groups/port groups, the method of determining power distribution ratios described in Embodiment 2-1 may be applied. The power ratios among the plurality of layers/ports in one group may be equally divided ratios or may be unequally divided ratios. The UE may determine equally/unequally divided power ratios (values), based on pieces of CSI information of the respective layers/ports in the one group, for example.

According to Embodiment 2-1, signaling of power ratios can be appropriately omitted, which can reduce signaling overhead for the UE.

Embodiment 2-2

In Embodiment 2-2, based on configured (pre-configured) power distribution ratios and the TBSs allocated to a plurality of respective transmission channels/signals (for example, PUSCHs) of different TBs, power distribution for the plurality of transmission channels/signals may be controlled.

For example, when X (for example, X=4) PUSCHs of different TBSs are space multiplexed, the UE may determine the power distribution ratio for the PUSCHs, based on information related to the pre-configured power distribution ratios and the allocated TBSs of the four PUSCHs.

In Embodiment 2-2, power distribution may be determined according to steps 1 and 2 described below. In the following, description will be given by taking four PUSCHs (PUSCHs #0 to #3) as an example. However, the number of PUSCHs is not limited to this, and channels/signals to be transmitted may be any channels/signals.

Determine/calculate TBSs (TBSs #0 to #3) of the four PUSCHs (PUSCHs #0 to #3) to be space multiplexed and perform ordering (re-ordering) of the four PUSCHs (step 1).

Map the PUSCHs and ports so that the power distribution ratio based on the TBSs is configured (step 2).

FIG. 7 is a diagram to show an example of configured power distribution ratios. As shown in FIG. 7, power ratios corresponding to respective ports (ports #0 to #3) are configured for the UE in advance. In the present disclosure, the information related to the power distribution ratio may be configured/notified to the UE by higher layer signaling (for example, RRC signaling/a MAC CE).

In step 1 above, the UE performs ordering of the four PUSCHs in descending (or ascending) order of TBS (for example, assume that ordering is performed in descending order to consequently obtain PUSCH #2, PUSCH #1, PUSCH #3, and then PUSCH #0).

Figure 8:
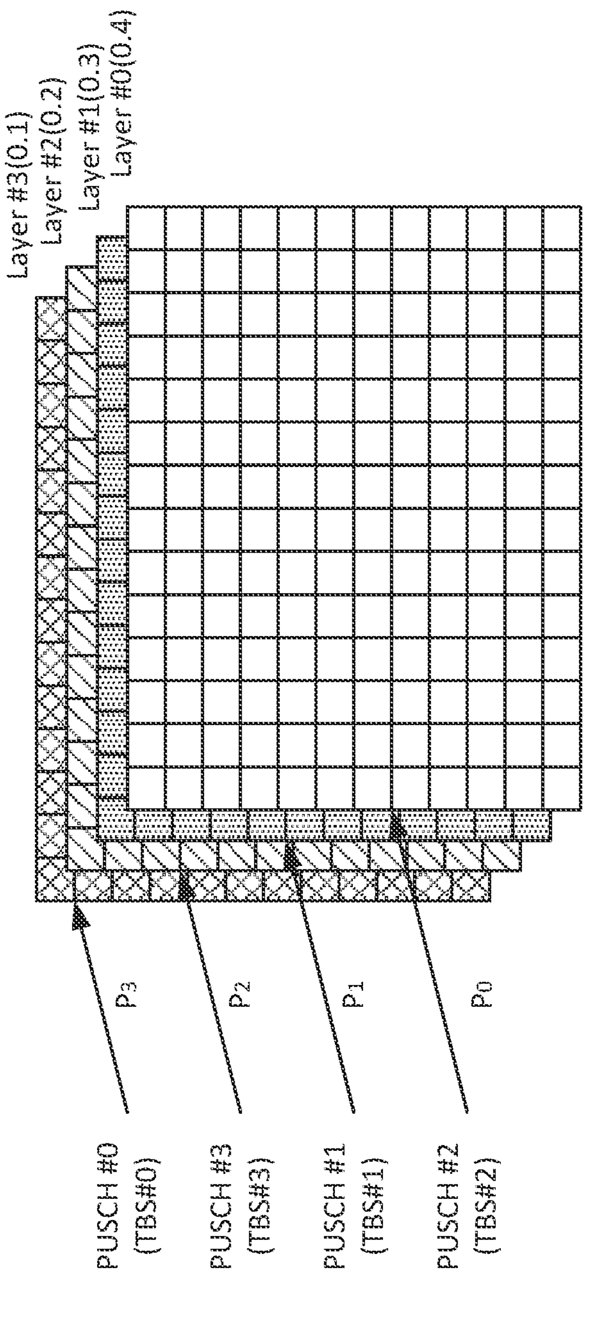
FIG. 8 is a diagram to show an example of mapping according to Embodiment 2-2.

In step 2 above, the UE maps PUSCHs and ports so that a higher power distribution ratio is configured for a PUSCH of a larger (or smaller) TBS. In this case, the UE may determine that PUSCH #0, PUSCH #1, PUSCH #2, and PUSCH #3 correspond respectively to port #3, port #1, port #0, and port #2 (refer to FIG. 8).

Note that, when mapping 1 above is applied (mapping 1 is assumed), the UE may control power distribution according to steps 1 and 2 above.

When mapping 2 above is applied (mapping 2 is assumed), the UE may determine that layers/ports corresponding to the same TB/CW belong to one layer group/port group.

In this case, for determination of the power ratios among layer groups/port groups, the method of determining power distribution ratios described in Embodiment 2-2 may be applied. The power ratios among the plurality of layers/ports in one group may be equally divided ratios or may be unequally divided ratios. The UE may determine equally/unequally divided power ratios (values), based on pieces of CSI information of the respective layers/ports in the one group, for example.

According to Embodiment 2-2, power ratios can be controlled more flexibly.

According to the second embodiment above, by performing power distribution control based on TBSs, optimal coverage compensation can be achieved.

Third Embodiment

A third embodiment relates to power control based on the payload size of an uplink shared channel (for example, a UL-SCH/PUSCH).

In a third embodiment, based on the payload size of an uplink shared channel, the power distribution of the uplink shared channel may be determined.

The payload size of the uplink shared channel may be the payload size of a MAC-PDU configured/notified by a higher layer. The UE may determine the power distribution of the uplink shared channel, based on the payload size of the MAC-PDU configured/notified by the higher layer.

Embodiment 3-1

In Embodiment 3-1, based on the ratios among the payloads of a plurality of transmission channels/signals (for example, PUSCHs), the power distribution of the plurality of transmission channels/signals may be controlled.

For example, when X (for example, X=4) PUSCHs of different TBSs are space multiplexed, the UE may determine the power distribution ratio for the PUSCHs, based on the ratios among the payloads of the four PUSCHs.

In Embodiment 3-1, power distribution may be determined according to steps 1 to 3 described below. In the following, description will be given by taking four PUSCHs (PUSCHs #0 to #3) as an example. However, the number of PUSCHs is not limited to this.

Determine/calculate the payloads (payloads #0 to #3) of the four PUSCHs (PUSCHs #0 to #3) to be space multiplexed (step 1).

Map the PUSCHs to respective layers (step 2).

At the time of association (mapping) between layers and ports, determine a power $P_i$ of each port, based on the ratio of the payloads (step 3).

The power $P_i$ in step 3 above may be calculated according to the following equation.

[Math. 3]

$$P_i = \left(\text{payload size}_i / \sum_{v=1}^{\gamma} \text{payload size}_v\right) P_{Total} \quad \text{(Equation 3)}$$

where γ denotes a total number of layers/ports, and $P_{Total}$ denotes a total available power.

The payload size (payloadsize) above may be, for example, the number of bits (expressed also as A) per transport block delivered to layer 1 (or the total number of bits of bit sequences of the transport block).

At the time of association (mapping) between layers and ports, a power based on the ratio of each payload may be configured for the power $P_i$ of the corresponding port by using higher layer signaling (step 3').

Note that, when mapping 1 above is applied (mapping 1 is assumed), the UE may control power distribution according to steps 1 to 3 (3') above.

When mapping 2 above is applied (mapping 2 is assumed), the UE may determine that layers/ports corresponding to the same TB/CW belong to one layer group/port group.

In this case, for determination of the power ratios among layer groups/port groups, the method of determining power distribution ratios described in Embodiment 3-1 may be applied. The power ratios among the plurality of layers/ports in one group may be equally divided ratios or may be unequally divided ratio. The UE may determine equally/unequally divided power ratios (values), based on pieces of CSI information of the respective layers/ports in the one group, for example.

According to Embodiment 3-1, signaling of power ratios can be appropriately omitted, which can reduce signaling overhead for the UE.

Embodiment 3-2

In Embodiment 3-2, based on configured (pre-configured) power distribution ratios and the payloads allocated to a plurality of respective transmission channels/signals (for example, PUSCHs), power distribution for the plurality of transmission channels/signals may be controlled.

For example, when X (for example, X=4) PUSCHs of different TBSs are space multiplexed, the UE may determine the power distribution ratio for the PUSCHs, based on information related to the pre-configured power distribution ratios and the allocated payloads of the four PUSCHs.

In Embodiment 3-2, power distribution may be determined according to steps 1 and 2 described below. In the following, description will be given by taking four PUSCHs (PUSCHs #0 to #3) as an example. However, the number of PUSCHs is not limited to this, and channels/signals to be transmitted may be any channels/signals.

Determine/calculate payloads (payloads #0 to #3) of the four PUSCHs (PUSCHs #0 to #3) to be space multiplexed and perform ordering (re-ordering) of the four PUSCHs (step 1).

Map the PUSCHs and ports so that the power distribution ratios based on the payloads are configured (step 2).

By using FIG. 7, steps 1 and 2 above will be described.

In step 1 above, the UE performs ordering of the four PUSCHs in descending (or ascending) order of payload (for example, assume that ordering is performed in descending order to obtain PUSCH #2, PUSCH #1, PUSCH #3, and then PUSCH #0).

In step 2 above, the UE may perform mapping between PUSCHs and ports so that a higher power distribution ratio is configured for a PUSCH of a larger (or smaller) payload. In this case, the UE may determine that PUSCH #0, PUSCH #1, PUSCH #2, and PUSCH #3 correspond respectively to port #3, port #1, port #0, and port #2.

Note that, when mapping 1 above is applied (mapping 1 is assumed), the UE may control power distribution according to steps 1 and 2 above.

When mapping 2 above is applied (mapping 2 is assumed), the UE may determine that layers/ports corresponding to the same TB/CW belong to one layer group/port group.

In this case, for determination of the power ratios among layer groups/port groups, the method of determining power distribution ratios described in Embodiment 3-2 may be applied. The power ratios among the plurality of layers/ports in one group may be equally divided ratios or may be unequally divided ratios. The UE may determine equally/unequally divided power ratios (values), based on pieces of CSI information of the respective layers/ports in the one group, for example.

According to Embodiment 3-2, power ratios can be controlled more flexibly.

According to the third embodiment above, by performing power distribution control based on payloads, optimal coverage compensation can be achieved.

Fourth Embodiment

A fourth embodiment relates to power control based on (the types/contents of) transmission channels/signals.

Embodiment 4-1

When different transmission channels/signals are transmitted (or space multiplexed) by using a plurality of layers, power distribution of the transmission channels/signals may be determined based on (the types/contents of) the transmission channels/signals.

Figure 9:
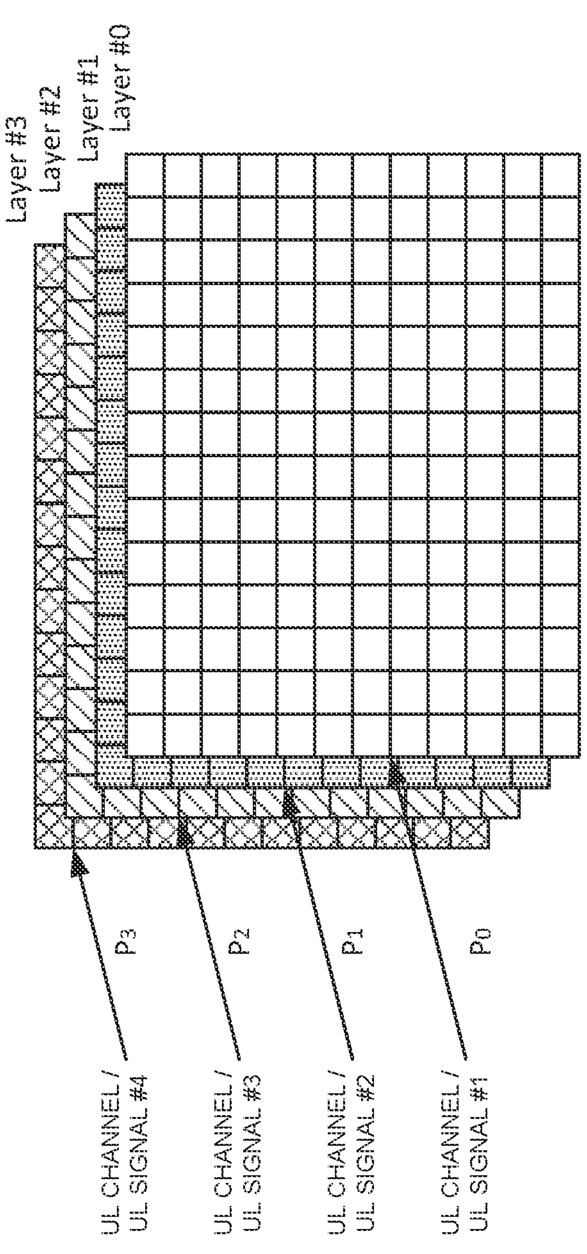
FIG. 9 is a diagram to show an example of mapping according to Embodiment 4-1.

FIG. 9 shows an example of a case where UL channels/UL signals #1 to #4 are mapped to layers #0 to #3, respectively. The UE may determine the transmission powers (for example, P0 to P3) or the power distribution of the transmission channels/signals, based on which transmission channel/signal is to be transmitted.

The transmission channel/signal may be at least one of the following types/contents:

- PUSCH only,
- PUSCH including UCI (HARQ-ACK information/SR/CSI report as content),
- PUCCH,
- physical sidelink shared channel (PSSCH),
- physical sidelink control channel (PSCCH),
- PRACH, and
- SRS.

In the present disclosure, a PUSCH, an uplink data channel, an uplink shared channel, uplink data, and the like may be interchangeably interpreted. UCI, a PUCCH, and uplink control information may be interchangeably interpreted.

Priority may be defined for each (type/content of) transmission channel/signal (Embodiment 4-1-1). The UE may control power distribution, based on the priority.

For example, the UE may allocate a higher power ratio in order from (the type/content of) a transmission channel/signal having a higher priority.

For example, the priority may be existing priority (defined in Rel. 16 or previous versions). For example, priority may be defined in descending order for the following descriptions.

PRACH transmission in a PCell,

PUCCH or PUSCH transmission with a higher (lower) priority index, in a case of PUCCH and PUSCH transmissions with the same priority index, PUCCH transmission including HARQ-ACK information/SR/link recovery request (LRR) or PUSCH transmission including HARQ-ACK information, in a case of PUCCH and PUSCH transmissions with the same priority index, PUCCH transmission including CSI or PUSCH transmission including CSI, in a case of PUCCH and PUSCH transmissions of the same priority index, PUSCH transmission not including HARQ-ACK information or CSI, being for a random access procedure (for example, a type-2 random access procedure), and being in a PCell, and SRS transmission of an aperiodic SRS having a higher priority than that of a semi-persistent/periodic SRS or PRACH transmission in a serving cell other than a PCell.

New priority for each channel/signal may be defined for MIMO multiplexing (space division multiplexing (SDM)).

For example, the new priority may be defined in descending order for the following descriptions:

PUSCH transmission multiplexed with UCI,

PUSCH transmission not multiplexed with UCI,

PUCCH transmission including HARQ-ACK information/an SR, and

PUCCH transmission including CSI report only.

Note that the orders related to priorities of (the types/contents of) channels/signals described in each embodiment of the present disclosure are merely examples and may be the order of priorities obtained by interchanging any of (the types/contents of) channels/signals of the described priorities Different types of transmission channels/signals may be space multiplexed. In this case, the power ratios among layers may be determined according to at least one of Embodiments 4-1-2 to 4-1-4 below.

A PUSCH and a PUCCH may be space multiplexed (Embodiment 4-1-2).

In this case, priority may be configured in descending order for the (types/contents of) channels in the following order.

PUSCH including UCI (including at least an HARQ-ACK),

PUSCH,

PUCCH including at least an HARQ-ACK, and

PUCCH not including any HARQ-ACK.

In Embodiment 4-1-2, one or more layers may correspond to each (type/content of) channel. For example, it may be configured that two layers correspond to a PUSCH while one layer other than those corresponding to the PUSCH corresponds to a PUCCH.

A PUSCH and a PSSCH may be space multiplexed (Embodiment 4-1-3).

In Embodiment 4-1-3, priorities may be configured in descending order for the (types/contents of) channels in the following order (Embodiment 4-1-3-1):

PUSCH and

PSSCH.

In Embodiment 4-1-3, when a specific condition is satisfied, the power of PUSCH transmission or PSSCH transmission may be defined in a specification or configured by higher layer signaling (RRC signaling/a MAC CE) without depending on transmission power configured/indicated for the PUSCH transmission/PSSCH transmission (Embodiment 4-1-3-2).

The specific condition may be whether there is a configuration of precoding to be used for space multiplexing of a PUSCH and a PSSCH, for example. For example, when no precoding to be used for space multiplexing of a PUSCH and a PSSCH is configured, the UE may determine the power ratio of the PSSCH to be a specific value (for example, 0). In this case, the power ratio of the PUSCH may be 1-(specific value).

In Embodiment 4-1-3, one or more layers may correspond to each (type/content of) channel. For example, it may be configured that two layers correspond to a PUSCH while one layer other than those corresponding to the PUSCH corresponds to a PSSCH.

A PUSCH and a PRACH may be space multiplexed (Embodiment 4-1-4).

In Embodiment 4-1-4, priorities may be configured in descending order for the (types/contents of) channels in the following order (Embodiment 4-1-3-1):

(Case where the PRACH is ordered by a PDCCH)

PUSCH and

PRACH, and (Other Cases)

PRACH and

PUSCH.

In Embodiment 4-1-4, when a specific condition is satisfied, the power of PUSCH transmission or PRACH transmission may be defined in a specification or configured by higher layer signaling (RRC signaling/a MAC CE) without depending on transmission power configured/indicated for the PUSCH transmission/PRACH transmission (Embodiment 4-1-4-2).

The specific condition may be whether there is a configuration of precoding to be used for space multiplexing of a PUSCH and a PRACH, for example. For example, when no precoding to be used for space multiplexing of a PUSCH and a PRACH is configured, the UE may determine the power ratio of the PUSCH to be a specific value (for example, 0). In this case, the power ratio of the PRACH may be 1-(specific value).

The specific condition may be, for example, whether the PRACH is configured to correspond to reception of an SSB. For example, when the PRACH is configured to correspond to reception of an SSB, the UE may determine the power ratio of the PUSCH to be a specific value (for example, 0). In this case, the power ratio of the PRACH may be 1-(specific value).

In Embodiment 4-1-3, one or more layers may correspond to each (type/content of) channel. For example, it may be configured that two layers correspond to a PUSCH while one layer other than those corresponding to the PUSCH corresponds to a PSSCH.

Note that, when mapping 1 above is applied (mapping 1 is assumed), the UE may control power distribution according to Embodiment 4-1 above.

When mapping 2 above is applied (mapping 2 is assumed), the UE may determine that layers/ports corresponding to the same TB/CW/channel/signal (RS)/sequence belong to one layer group/port group.

In this case, for determination of the power ratios among layer groups/port groups, the method of determining power distribution ratios described in Embodiment 2-2/2-3 may be applied. The power ratios among the plurality of layers/ports in one group may be equally divided ratios or may be unequally divided ratios. The UE may determine equally/unequally divided power ratios (values), based on pieces of CSI information of the respective layers/ports in the one group, for example.

Variation of Embodiment 4-1

When different channels/signals are space multiplexed, the power ratio of a specific channel with low priority may be determined to be 0. In other words, when different channels/signals are space multiplexed, the specific channel with low priority may be dropped.

For example, when a PUSCH and a PRACH are space multiplexed, the UE may drop the PUSCH (may determine the power ratio of the PUSCH to be 0).

According to Embodiment 4-1, power distribution can be appropriately controlled for each channel/signal to be transmitted.

Embodiment 4-2

Channels/signals other than PUSCHs may be space multiplexed by using a plurality of layers/ports.

Figure 10:
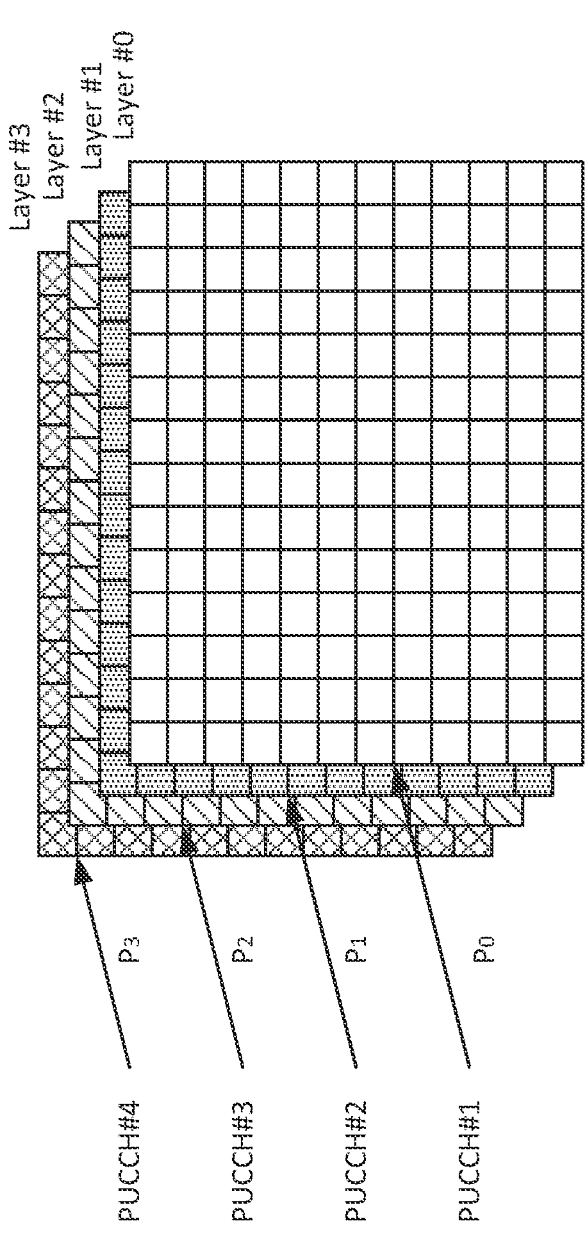
FIG. 10 is a diagram to show an example of mapping according to Embodiment 4-2.

For example, PUCCHs may be space multiplexed in a plurality of layers/ports. FIG. 10 shows an example of a case where PUCCHs #1 to #4 are mapped to layers #0 to #3, respectively. In this case, determination/control of a power ratio of each layer may be performed according to at least one of the first embodiment to the third embodiment above.

The determination/control of a power ratio of each layer may be performed based on uplink control information multiplexed to a PUCCH (or transmitted by using the PUCCH). For example, when an HARQ-ACK is mapped to PUCCH #1 and CSI (no HARQ-ACK) is mapped to PUCCH #2, the transmission power of PUCCH #1 may be configured to be higher than the transmission power of PUCCH #2. Note that one piece of uplink control information may be mapped to a plurality of layers.

For example, PRACHs may be space multiplexed in a plurality of layers/ports. In this case, the determination/control of a power ratio of each layer may be performed according to at least one of the first embodiment to the third embodiment above.

According to Embodiment 4-2, power distribution in space multiplexing of channels/signals other than PUSCHs can be appropriately performed.

Fifth Embodiment

A fifth embodiment relates to power control based on control information.

In the fifth embodiment, power distribution (power ratios) among layers/ports may be determined based on control information (for example, DCI) received from the base station. The UE may determine power distribution (power ratios) among layers/ports, based on (a specific field included in) the DCI.

Embodiment 5-1

In Embodiment 5-1, a power ratio of each layer/port may be notified/indicated to the UE according to the number of layers/number of ports supported by the UE. The UE may report UE capability information related to the number of layers/number of ports supported by the UE to a network (NW, base station).

For example, the UE may determine a power of each layer/port according to the number of layers/number of ports, based on a specific field included in DCI.

In Embodiment 5-1, a power ratio of each layer/port may be determined based on CSI feedback/SRS reception quality of each layer/port.

In Embodiment 5-1, a first period (for example, x symbols) after the CSI feedback/SRS transmission for each layer/port from the UE (reception of this by the NW), the UE may receive control information notifying/indicating power ratios.

In Embodiment 5-1, in slots a second period (for example, y1 symbols/slots) after the reception by the UE of the control information notifying/indicating the power ratios, the power ratios notified/indicated by the control information may be applied to the UE.

In Embodiment 5-1, in slots a third period (for example, y2 symbols/slots) before the reception by the UE of the control information notifying/indicating the power ratios, the power ratios notified/indicated by the control information may be applied to the UE.

Embodiment 5-2

In Embodiment 5-2, information related to power distribution (information related to power ratios) described in Embodiments 2-2 and 3-2 above may be configured for the UE in advance. The UE may be indicated with power ratios corresponding to a plurality of layers/ports included in information related to configured power distribution, by (a specific field included in) control information (DCI).

Granularity (for example, 0.1) of the value of each power ratio may be defined. The total of power ratios of a plurality of layers/ports corresponding to one codepoint of the specific field included in the DCI may be a specific value (for example, 1).

FIG. 11 is a diagram to show an example of information related to power distribution according to Embodiment 5-2. As shown in FIG. 11, a plurality of power ratios for layer #0 to layer #3 are configured for the UE as information related to power distribution. The UE determines power ratios to apply to layers #0 to #3, based on (the codepoint of) a specific field included in DCI. In the example shown in FIG. 11, when a DCI codepoint indicates 01, the UE determines the power ratio of each layer to be 0.25.

Note that, in the drawings illustrating indication by DCI in the present disclosure as shown in FIG. 11, the number of bits of the DCI codepoint, the number of layers/ports, the values of power ratios, the number of TBs/CWs are merely examples, and the described examples are not restrictive.

Embodiment 5-3

In Embodiment 5-3, information related to power distribution (information related to power ratios) described in Embodiments 2-2 and 3-2 above may be configured for the UE in advance. The UE may be notified/indicated with the values of power ratios in a specific period among the values of the plurality of power ratios included in information related to configured power distribution, by using control information (for example, DCI).

The specific period may be notified/configured/indicated to the UE by using higher layer signaling/physical layer signaling or may be defined in a specification.

For example, assume a slot in which the control information (DCI) is received is N. In this case, the specific period may be a period from N+a1 slot to N+a2 slot. a1 and a2 may be configured/indicated to the UE by higher layer signaling/physical layer signaling or may be defined in a specification.

Assume a slot in which the control information (DCI) is received is N. In this case, the specific period may be a period subsequent to N+a3 slot. a3 may be configured/indicated to the UE by higher layer signaling/physical layer signaling or may be defined in a specification.

The specific period may be a period from the reception of the control information (DCI) to the n-th (n is an integer equal to or larger than 1) UL transmission.

In this way, by enabling configuration of power ratios only in an appropriate period, configuration considering an element (for example, channel quality) in which changes in time are assumed is possible.

In Embodiment 5-3, information related to power distribution (information related to power ratios) described in Embodiments 2-2 and 3-2 above may be configured for the UE in advance. The UE may be notified/indicated with a change of the value(s) of one or more power ratios included in the information related to configured power distribution to a specific value, by using control information (for example, DCI).

The specific value may be 0. In this case, the UE may increment (increase), by the same value, each of the values of the power ratios of the layers/ports other than the layer/port indicated to be changed to 0 by the control information (DCI), so that the total of the values of the power ratios would be 1.

The specific value may be 1. In this case, the UE may change, to 0, each of the values of the power ratios of the layers/ports other than the layer/port indicated to be changed to 1 by the control information (DCI).

Information related to the specific value may be configured/indicated to the UE by using higher layer signaling/control information (DCI). The information related to the specific value may be information indicating that the specific value is 0 or 1.

By enabling change of the values of a plurality of configured power ratios, appropriate power control can be performed when a layer/port corresponding to a channel having channel quality being instantaneously deteriorated exists.

FIG. 12A and FIG. 12B are diagrams to show examples of a method of changing a power ratio (s) according to Embodiment 5-3. FIG. 12A and FIG. 12B show methods of indicating change of a power ratio(s) of a specific layer(s) to 0 by using DCI. The UE may be indicated with one layer having a power ratio to be changed to 0, by using DCI (FIG. 12A). The UE may be indicated with one or more layers each having a power ratio to be changed to 0, by using DCI (FIG. 12B).

Embodiment 5-4

In Embodiment 5-4, information related to power distribution (information related to power ratios) for TBs/CWs may be configured for the UE in advance. The UE may be indicated with power ratios corresponding to a plurality of TBs/CWs included in information related to configured power distribution, by (a specific field included in) control information (DCI) (Embodiment 5-4-1).

Granularity (for example, 0.1) of the value of each power ratio may be defined. The total of power ratios of a plurality of TBs/CWs corresponding to one codepoint of the specific field included in the DCI may be a specific value (for example, 1).

In Embodiment 5-4-1, the power ratios of a plurality of layers/ports corresponding to each of the TBs/CWs may be configured/controlled according to at least one of the second embodiment to the fifth embodiment described above. For example, power ratios corresponding to the plurality of TBs/CWs may be determined as described in the present embodiment, and power ratios of the plurality of layers/ports corresponding to each of the TBs/CWs may be determined according to Embodiment 5-2 or 5-3 above. For example, power ratios corresponding to the plurality of TBs/CWs may be determined as described in the present embodiment, and power rations of the plurality of layers/ports corresponding to each of the TBs/CWs may be determined according to Embodiment 2-2 above.

In Embodiment 5-4, information related to power distribution (information related to power ratios) for TBs/CWs may be configured for the UE in advance. The UE may be notified/indicated with the values of power ratios in a specific period among the values of the plurality of power ratios included in information related to configured power distribution, by using control information (for example, DCI) (Embodiment 5-4-2).

The specific period may be notified/configured/indicated to the UE by using higher layer signaling/physical layer signaling or may be defined in a specification.

For example, assume a slot in which the control information (DCI) is received is N. In this case, the specific period may be a period from N+a1 slot to N+a2 slot. a1 and a2 may be configured/indicated to the UE by higher layer signaling/physical layer signaling or may be defined in a specification.

Assume a slot in which the control information (DCI) is received is N. In this case, the specific period may be a period subsequent to N+a3 slot. a3 may be configured/indicated to the UE by higher layer signaling/physical layer signaling or may be defined in a specification.

The specific period may be a period from the reception of the control information (DCI) to the n-th (n is an integer equal to or larger than 1) UL transmission.

In Embodiment 5-4, information related to power distribution (information related to power ratios) for TBs/CWs may be configured for the UE in advance. The UE may be notified/indicated with a change of the value (s) of one or more power ratios included in the information related to configured power distribution to a specific value, by using control information (for example, DCI) (Embodiment 5-4-3).

The specific value may be 0. In this case, the UE may increment (increase), by the same value, each of the values of the power ratios of the layers/ports other than the layer/port indicated to be changed to 0 by the control information (DCI), so that the total of the values of the power ratios would be 1.

The specific value may be 1. In this case, the UE may change, to 0, each of the values of the power ratios of the layers/ports other than the layer/port indicated to be changed to 1 by the control information (DCI).

Information related to the specific value may be configured/indicated to the UE by using higher layer signaling/ control information (DCI). The information related to the specific value may be information indicating that the specific value is 0 or 1.

In Embodiments 5-4-2 and 5-4-3, the power ratios of a plurality of layers/ports corresponding to each of the TBs/CWs may be configured/controlled according to at least one of the second embodiment to the fifth embodiment described above. For example, power ratios corresponding to the plurality of TBs/CWs may be determined as described in the present embodiment, and power ratios of the plurality of layers/ports corresponding to each of the TBs/CWs may be determined according to Embodiment 5-2 or 5-3 above. For example, power ratios corresponding to the plurality of TBs/CWs may be determined as described in the present embodiment, and power rations of the plurality of layers/ports corresponding to each of the TBs/CWs may be determined according to Embodiment 2-2 above.

Embodiment 5-5

In Embodiment 5-5, an example of a field of DCI used for notification related to power ratios will be described.

The UE may determine power ratios corresponding to a plurality of layers/ports by using one DCI field (codepoint) (Embodiment 5-5-1).

Correspondence between the DCI field (codepoint) and the power ratios may be defined in a specification in advance, or the UE may be notified of the correspondence by using higher layer signaling.

FIG. 13A is a diagram to show an example of correspondences between a DCI codepoint and power ratios according to Embodiment 5-5. As shown in FIG. 13A, such correspondence that power ratios (power configuration values) of a plurality of layers correspond to one DCI codepoint is defined/configured. The UE determines power ratios corresponding to one codepoint indicated by DCI, from the correspondence.

The UE may determine power ratios corresponding to a plurality of layers/ports by using a plurality of DCI fields (codepoints) (Embodiment 5-5-2).

Correspondence between the DCI field (codepoint) and the power ratios may be defined in a specification in advance, or the UE may be notified of the correspondence by using higher layer signaling.

The UE may receive DCI fields (codepoints) corresponding to the number of layers/ports/TBs/CWs.

FIG. 13B is a diagram to show another example of the correspondence between a DCI codepoint and power ratios according to Embodiment 5-5. As shown in FIG. 13B, such correspondence that power ratios of a plurality of layers correspond to one DCI codepoint is defined/configured for each specific TB. The UE determines power ratios corresponding to the codepoint indicated by DCI for each TB, from the correspondence.

Note that, in Embodiment 5-5, association between priorities of channels/signals (for example, priorities described in the fourth embodiment) and indices of layers/ports may be defined. For example, such association that a channel/signal having higher priority corresponds to a lower (or higher) index of a layer/port may be defined. In this way, for example, by association between channels and layers, the number of bits of a DCI field for changing power ratios can be reduced.

According to the fifth embodiment described above, it is possible to appropriately and flexibly control power distribution corresponding to layers/ports/TBs/CWs by using control information.

Others

Note that, although examples of configuring power distribution ratios in proportion to the sizes of TBSs/payloads have been shown in the above-described embodiments, power distribution ratios may be configured in inverse proportion to the sizes of TBSs/payloads.

For power distribution ratios in at least one of the above-described embodiments, power ratios among layers/ports may be configured/indicated/notified by using higher layer signaling (RRC information element/MAC CE)/physical layer signaling (DCI).

For power distribution ratios in at least one of the above-described embodiments, power ratios among layers/ports may be determined in a precoding matrix. In this case, the power ratios among the layers may be the same or may be different from each other. In the present disclosure, a power ratio may be interpreted as an amplitude (in the precoding matrix).

For power ratios, power of each port may be determined according to at least one of a result of singular value decomposition of a channel matrix using SVD and water pouring principle. Water pouring principle may be expressed by Equation 1 described above.

The power control of each of the embodiments in the present disclosure may be applied to repetition transmission (repetition). The UE may determine/apply the same power ratio through a plurality of repetition transmissions. The UE may determine/apply a power ratio independently for each repetition transmission (each transmission). For example, the UE may be configured with/notified of candidates for power ratios among layers/ports for each repetition transmission (each transmission) in advance and may be notified of one power ratio from the candidates in DCI triggering the repetition transmission.

Power control of the present disclosure may be applied to retransmission control. The UE may determine/apply the same power ratio as that of the initial transmission/last transmission at the time of retransmission of a channel/signal. The UE may determine/apply a power ratio independently for each retransmission (each transmission) (for example, may determine transmission power of only a specific layer to be a specific value (for example, 1 or 0)).

Note that at least one of the above-described embodiments may be applied only to a UE that has reported specific UE capability or that supports the specific UE capability.

The specific UE capability may indicate at least one of the following:

- whether to support power control of a PUSCH per layer/port/TRP,
- whether to support space multiplexing using at least one of a specific number of (for example, four) layers/ports or more and a specific number of (for example, two) CWs or more,
- whether to support space multiplexing of a plurality of different channels/signals, and
- whether to support space multiplexing of channels/signals (for example, PUCCHs/PRACHs) other than PUSCHs.

Note that the specific UE capability may be capability for a CB based PUSCH, capability for an NCB based PUSCH, or capability not distinguishing these.

The specific UE capability may be capability applied over all the frequencies (commonly irrespective of frequency), capability per frequency (for example, a cell, a band, a BWP), capability per frequency range (for example, FR1, FR2), or capability per subcarrier spacing.

The specific UE capability may be capability applied over all the duplex schemes (commonly irrespective of duplex scheme) or capability per duplex scheme (for example, time division duplex (TDD) or frequency division duplex (FDD)).

At least one of the above-described embodiments may be applied when the UE is configured with specific information related to the above-described embodiment by higher layer signaling (when it is not configured, Rel-15/16 operation is applied, for example). For example, the specific information may be information indicating that power of a PUSCH per layer/port/TRP is enabled, any RRC parameter for a specific release (for example, Rel. 18), or the like. The UE may be configured with which embodiment/case/condition among those described above is to be used for PHR control, by using a higher layer parameter.

A "layer" in the present disclosure may be interpreted as at least one of a "TRP," an "RS (for example, an SRS, a reference RS corresponding to a TCI state)," "PUSCH transmission corresponding to an RS," "PDSCH transmission/reception corresponding to an RS," a "PUSCH," a "PDSCH," a "group constituted of PUSCH transmission (s) corresponding to one or more RSs (group including PUSCH transmission (s) corresponding to one or more RSs)," a "group constituted of PDSCH transmission (s)/reception (s) corresponding to one or more RSs (group including PDSCH transmission (s)/reception (s) corresponding to one or more RSs)," and the like.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 14:
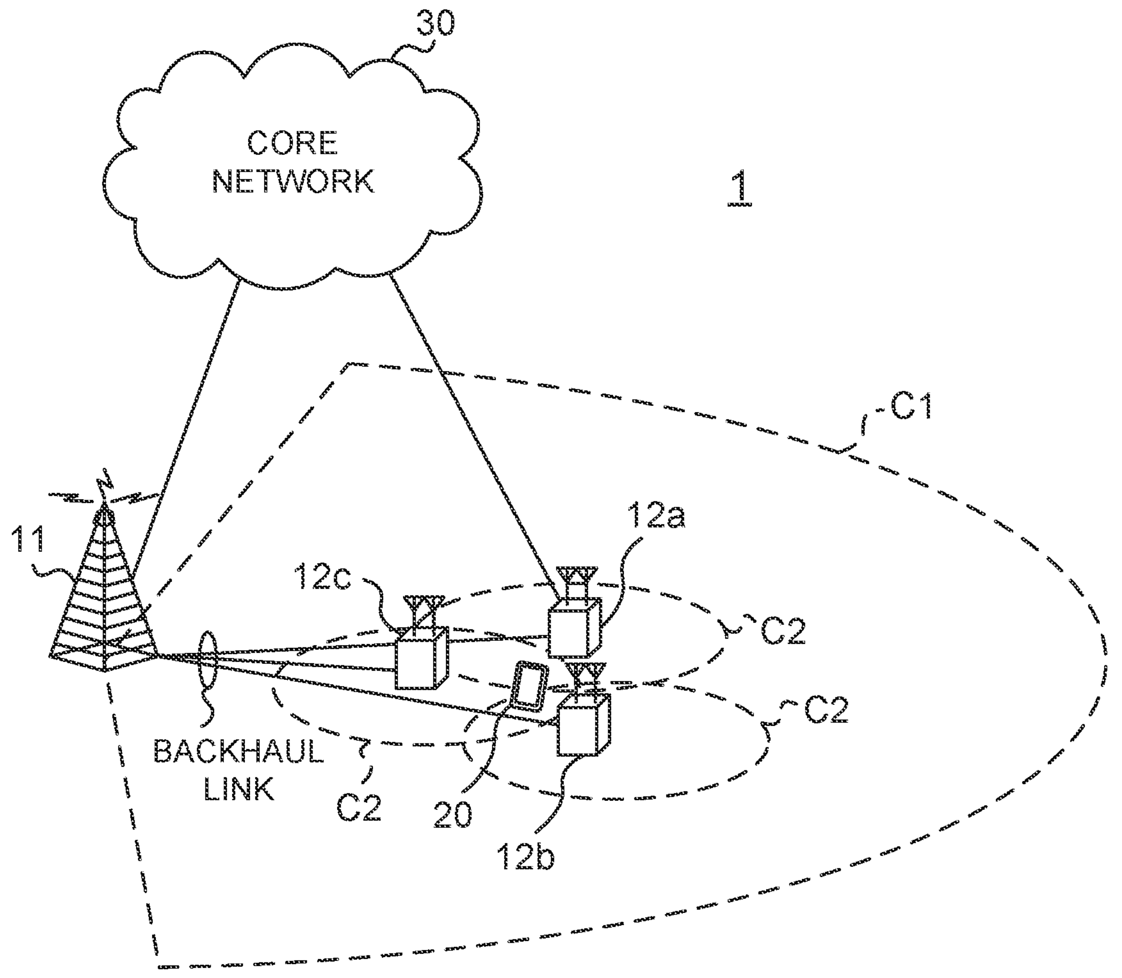
FIG. 14 is a diagram to show an example of a schematic structure of a radio communication system according to one embodiment.

FIG. 14 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHZ), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 15:
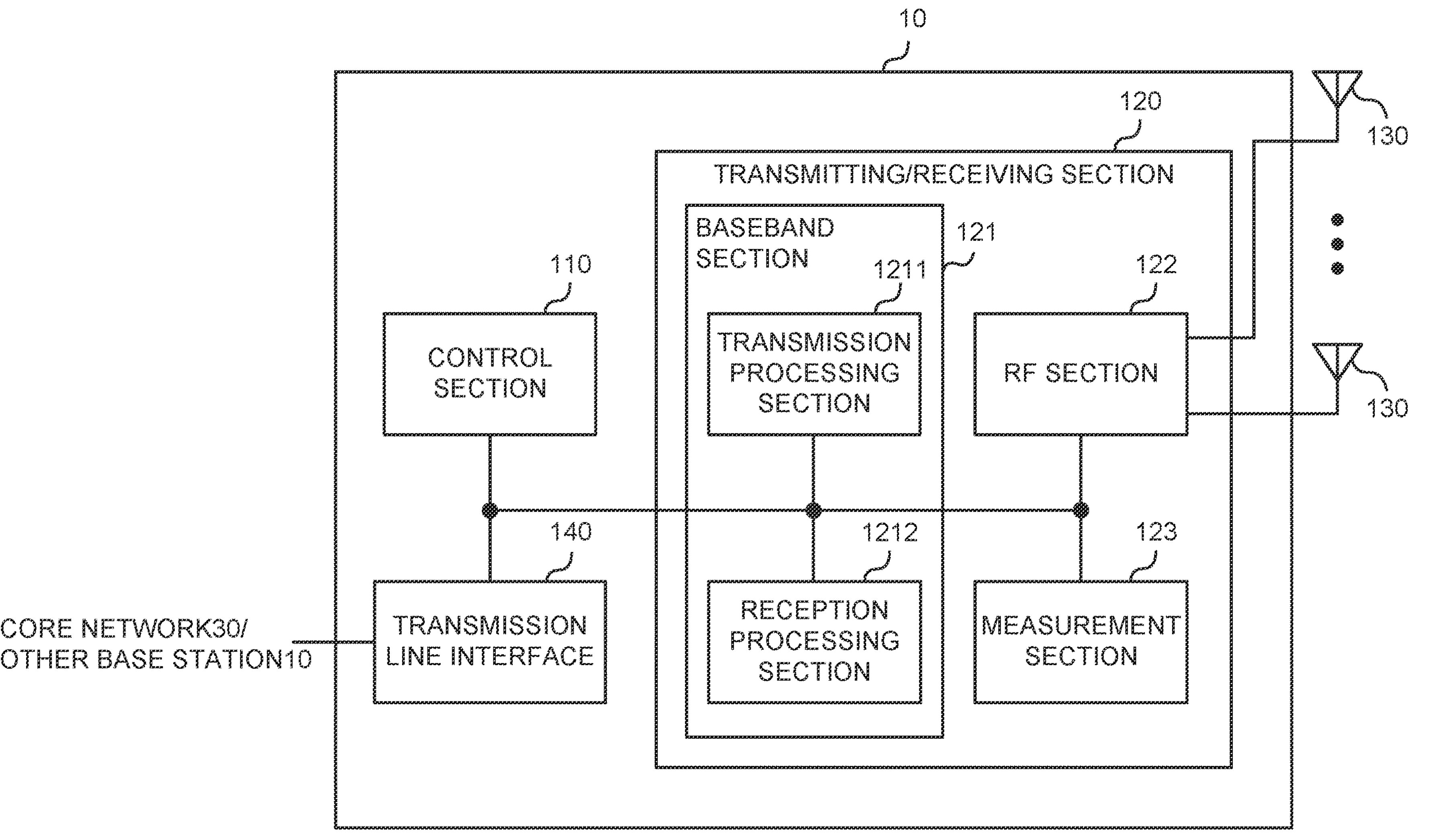
FIG. 15 is a diagram to show an example of a structure of a base station according to one embodiment.

FIG. 15 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit, to a terminal, information for performing judgment, for each of a plurality of different transport blocks (TBs), of the number of layers corresponding to the TB and control of association between each of the plurality of TBs and a layer. The transmitting/receiving section 120 may receive, by using one or more layers, each of the plurality of different TBs transmitted in a same time resource and frequency resource (first embodiment).

The transmitting/receiving section 120 may transmit, to the terminal, information for performing control based on at least one of the transport block sizes and payload sizes of a plurality of uplink shared channels to apply different power ratios to the plurality of uplink shared channels. The transmitting/receiving section 120 may receive the plurality of uplink shared channels to which the different power ratios are applied (second and third embodiments).

The transmitting/receiving section 120 may transmit, to the terminal, information for applying different power ratios to one or more layers corresponding to each of a plurality of channels, based on priorities corresponding to the plurality of respective channels. The transmitting/receiving section 120 may receive the plurality of channels to which the different power ratios are applied, in the same time resource and frequency resource (fourth embodiment).

The transmitting/receiving section 120 may transmit, to the terminal, information for applying different power ratios to a plurality of layers. The transmitting/receiving section 120 may receive uplink control channels or random access channels of the plurality of layers transmitted based on the information by the terminal with application of the different power ratios (fourth embodiment).

The transmitting/receiving section 120 may transmit configuration information and downlink control information for performing control to apply different power ratios to the plurality of layers, the configuration information and the downlink control information being notified by using higher layer signaling. The transmitting/receiving section 120 may receive uplink shared channels of the plurality of layers to which the different power ratios are applied (fifth embodiment).

(User Terminal)

Figure 16:
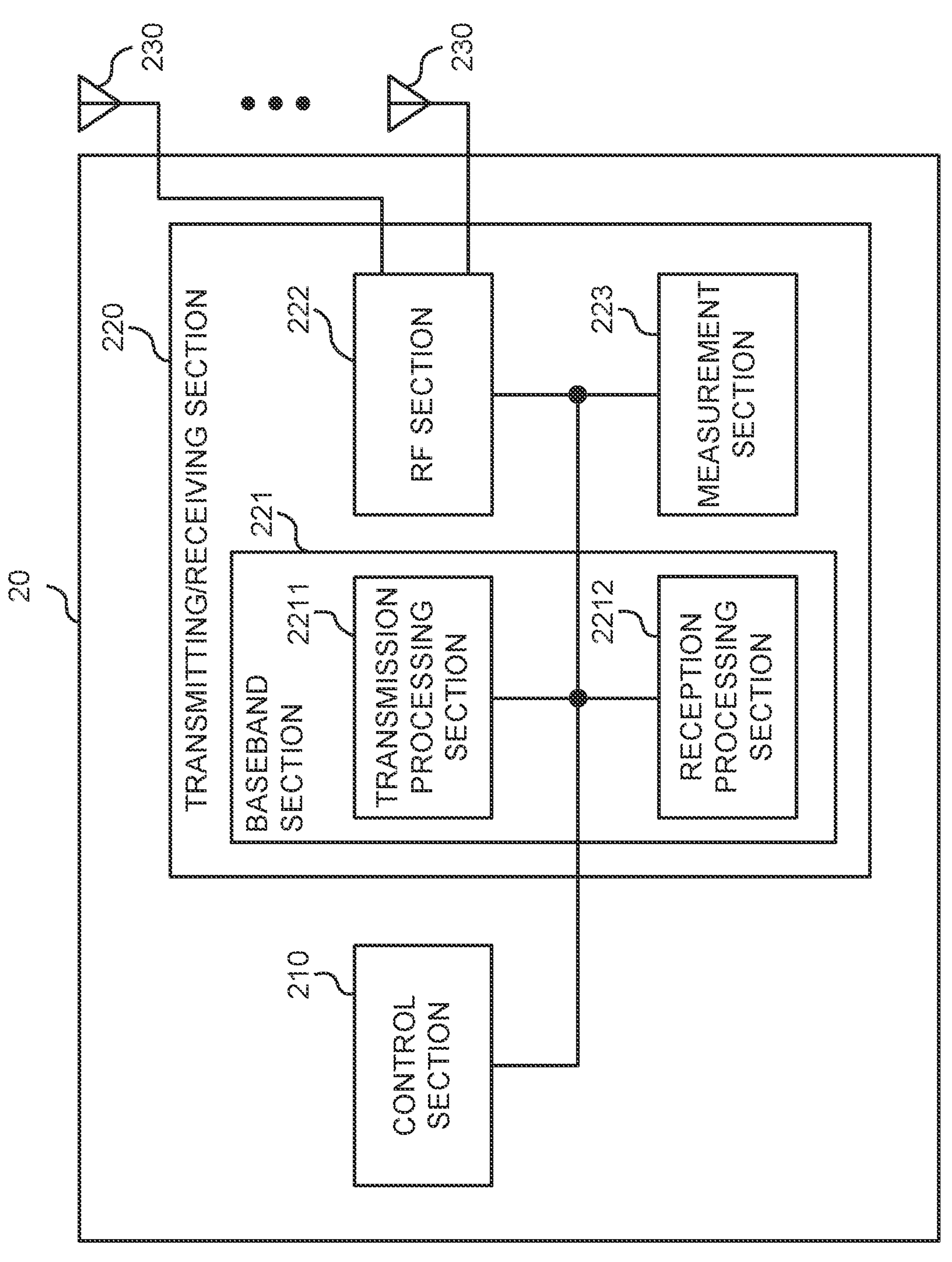
FIG. 16 is a diagram to show an example of a structure of a user terminal according to one embodiment.

FIG. 16 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that whether to apply DFT processing may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoder is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The control section 210 may determine, for each of a plurality of different transport blocks (TBs), the number of layers corresponding to the TB and control association between each of the plurality of TBs and a layer. The transmitting/receiving section 220 may transmit, by using one or more layers, each of the plurality of different TBs in a same time resource and frequency resource (first embodiment).

The control section 210 may determine the number of layers and a layer corresponding to each of the plurality of TBs, based on at least one of the sizes of the plurality of respective TBs, at least one of a downlink reference signal and an uplink reference signal, and priority of the TB (first embodiment).

The control section 210 may determine the number of layers corresponding to each of the plurality of different Tbs, by using at least one of higher layer signaling and downlink control information (first embodiment).

The number of layers may be a maximum value of the number of layers possible to be multiplexed for one transmission occasion (first embodiment).

The control section 210 may perform control to apply different power ratios to a plurality of uplink shared channels, based on at least one of the transport block sizes and payload sizes of the plurality of uplink shared channels. The transmitting/receiving section 220 may transmit the plurality of the uplink shared channels by applying the different power ratios to the plurality the uplink shared channels (second and third embodiments).

The control section 210 may determine the different power ratios, based on the ratio of transport blocks of the plurality of uplink shared channels (second embodiment).

The control section 210 may determine the different power ratios, based on the ratios of the payload sizes of the plurality of uplink shared channels in a Medium Access Control Protocol Data Unit (MAC-PDU) (third embodiment).

The transmitting/receiving section 220 may receive information related to the different power ratios by using higher layer signaling. The control section 210 may perform control to apply the different power ratios, based on the information related to the different power ratios and at least one of the transport block sizes and the payload sizes (second and third embodiments).

The control section 210 may perform control to apply different power ratios to one or more layers corresponding to each of a plurality of channels, based on priorities corresponding to the plurality of respective channels. The transmitting/receiving section 220 may apply the different power ratios to the plurality of channels and transmit the plurality of channels in the same time resource and frequency resource (fourth embodiment).

The plurality of channels may be at least two of a physical uplink shared channel, a physical uplink control channel, a physical sidelink shared channel, a physical sidelink control channel, a physical random access channel, and a sounding reference signal (fourth embodiment).

A channel including a Hybrid Automatic Repeat reQuest ACKnowledgement (HARQ-ACK) may have the priority being higher than that of a channel not including any HARQ-ACK (fourth embodiment).

The control section 210 may determine the power ratio of a layer corresponding to at least one of a channel and a signal having low priority among at least one of the different types of channels and signals, to be 0 (fourth embodiment).

The control section 210 may perform control to apply different power ratios to a plurality of layers. The transmitting/receiving section 220 may apply the different power ratios to at least one of uplink control channels and random access channels of the plurality of layers and transmit the at least one of the uplink control channels and the random access channels (fourth embodiment).

The control section 210 may determine that a plurality of layers correspond for each of different pieces of uplink control information included in the uplink control channels (fourth embodiment).

In a case of transmitting uplink control channels of the plurality of layers, the control section 210 may determine the different power ratios by prioritizing a layer for transmitting Hybrid Automatic Repeat reQuest ACKnowledgement (HARQ-ACK) information included in the uplink control channel (fourth embodiment).

The control section 210 may perform control to apply different power ratios to a plurality of layers, based on at least one of configuration information and downlink control information notified by higher layer signaling. The transmitting/receiving section 220 may transmit the uplink shared of the plurality of layers channels by applying the different power ratios to the plurality of layers (fifth embodiment).

The different power ratios may be based on at least one of report of channel state information and reception quality of a sounding reference signal (fifth embodiment).

The control section 210 may change the power ratio of at least one of a specific layer and a TB in the configuration information, to a specific value, based on the downlink control information (fifth embodiment).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 17:
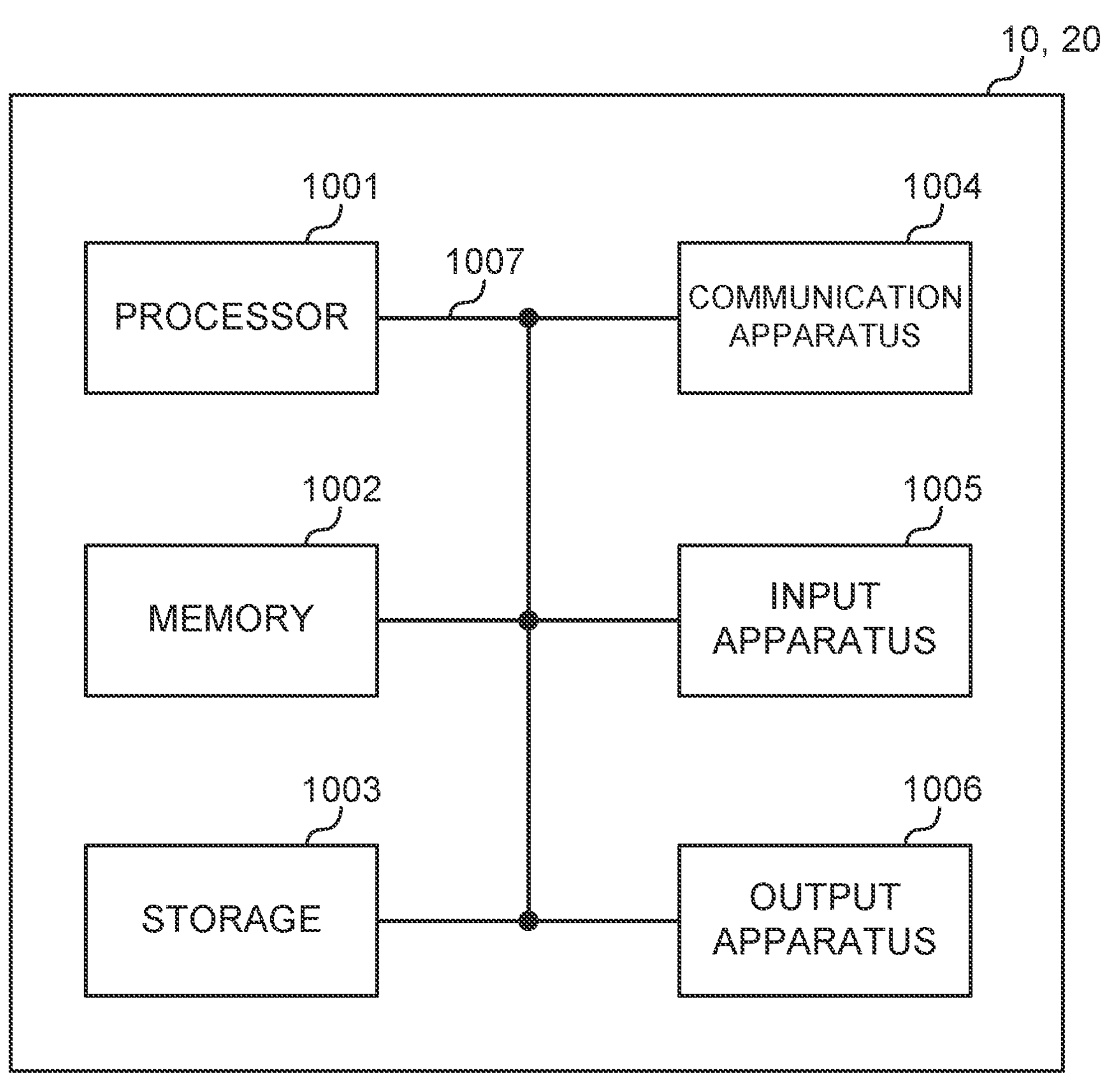
FIG. 17 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 17 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIS.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain channel/signal outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:

a control section that determines, for each of a plurality of different transport blocks (TBs), the number of layers corresponding to the TB and controls association between each of the plurality of TBs and a layer; and a transmitting section that transmits, by using one or more layers, each of the plurality of different TBs in a same time resource and frequency resource, wherein the control section determines the number of layers and a layer corresponding to each of the plurality of TBs, based on at least one of sizes of the plurality of respective TBs, at least one of a downlink reference signal and an uplink reference signal, and priority of the TB.

2. The terminal according to claim 1, wherein the control section determines the number of layers corresponding to each of the plurality of different Tbs, by using at least one of higher layer signaling and downlink control information.

3. The terminal according to claim 1, wherein the number of layers is a maximum value of the number of layers possible to be multiplexed for one transmission occasion.

4. A radio communication method for a terminal, the radio communication method comprising:

determining, for each of a plurality of different transport blocks (TBs), the number of layers corresponding to the TB and controlling association between each of the plurality of TBs and a layer;

transmitting, by using one or more layers, each of the plurality of different TBs in a same time resource and frequency resource; and determining the number of layers and a layer corresponding to each of the plurality of TBs, based on at least one of sizes of the plurality of respective TBs, at least one of a downlink reference signal and an uplink reference signal, and priority of the TB.

5. A base station comprising:

a transmitting section that transmit, to a terminal, information for performing judgment of, each of a plurality of different transport blocks (TBs), the number of layers corresponding to the TB and control of association between each of the plurality of TBs and a layer; and a receiving section that receives, by using one or more layers, each of the plurality of different TBs transmitted in a same time resource and frequency resource, wherein the control section determines the number of layers and a layer corresponding to each of the plurality of TBs, based on at least one of sizes of the plurality of respective TBs, at least one of a downlink reference signal and an uplink reference signal, and priority of the TB.

* * * * *